Figure 1:
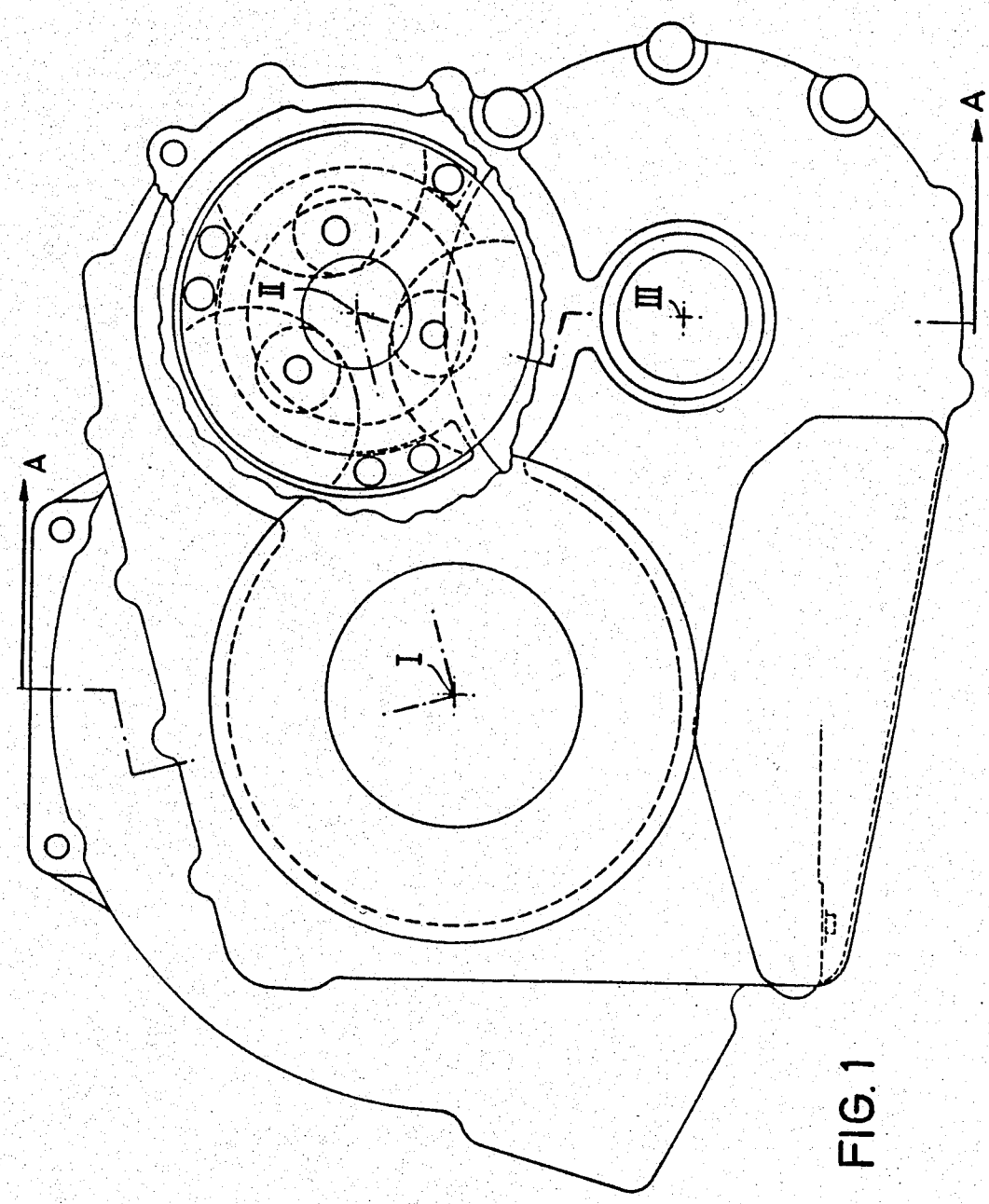

United States Patent [19]

van Deursen et al.

[11] Patent Number: 4,528,870
[45] Date of Patent: Jul. 16, 1985

[54] TRANSMISSION FOR VEHICLES, IN PARTICULAR FOR AUTOMOBILES WITH FRONT WHEEL DRIVE

[75] Inventors: Petrus H. van Deursen, Deurne, Netherlands; Eugen Svab; Gerhard Abromeit, both of Cologne, Fed. Rep. of Germany

[73] Assignee: Van Doorne's Transmissie B.V., Tilburg, Netherlands

[21] Appl. No.: 374,891

[22] Filed: May 4, 1982

[51] Int. Cl.³ .................. F16H 37/08; F16H 37/00
[52] U.S. Cl. .................................. 74/701; 74/689; 74/694; 74/740; 74/789
[58] Field of Search .............. 74/700, 701, 740, 789, 74/792, 689, 695, 694

[56] References Cited

U.S. PATENT DOCUMENTS

| | | | |
|---|---|---|---|
| 2,737,829 | 3/1956 | Wilson | 74/694 |
| 3,670,594 | 6/1972 | Roper | 74/689 |
| 4,138,837 | 3/1979 | Love | 74/740 X |
| 4,317,389 | 3/1982 | Falzoni | 74/689 |
| 4,335,629 | 6/1982 | Falzoni | 74/689 |

FOREIGN PATENT DOCUMENTS

| | | | |
|---|---|---|---|
| 632936 | 12/1961 | Canada | 74/689 |
| 0004130 | 9/1979 | European Pat. Off. | 74/689 |
| 1630298 | 8/1977 | Fed. Rep. of Germany. | |
| 2928191 | 1/1980 | Fed. Rep. of Germany. | |
| 2948194 | 6/1980 | Fed. Rep. of Germany. | |
| 2948195 | 6/1980 | Fed. Rep. of Germany. | |
| 10242 | of 1914 | United Kingdom | 74/740 |

Primary Examiner—Allan D. Herrmann
Assistant Examiner—Arthur T. Quiray
Attorney, Agent, or Firm—Cushman, Darby & Cushman

[57] ABSTRACT

The invention relates to a transmission for vehicles, in particular for automobiles with front wheel drive, which have a driving motor mounted transverse to the longitudinal direction of the vehicle, whose drive shaft drives the primary shaft of an infinitely variable belt drive having a secondary shaft driven in the same direction of rotation by means of a drive belt and mounted coaxially with the drive pinion of a differential gear provided with output shafts. A reversing and reduction gearing, designed as a planetary gearset, is mounted coaxially with the secondary shaft of the belt drive and connected through its input member to the secondary shaft and through its output member to the drive pinion of the differential gearing, while its reactive section is fixed to the casing. As a result, a very compact transmission unit is achieved, having in forward drive position an output rotation in the same direction as the input rotation.

3 Claims, 3 Drawing Figures

TRANSMISSION FOR VEHICLES, IN PARTICULAR FOR AUTOMOBILES WITH FRONT WHEEL DRIVE

The invention relates to a transmission for vehicles, in particular for automobiles with front wheel drive, which have a driving motor mounted transverse with respect to the vehicle, the motor drive shaft driving the primary shaft of an infinitely variable belt drive, whose secondary shaft is driven in the same direction of rotation by means of the drive belt and is mounted coaxially with the drive pinion of a differential gearing with output shafts.

A similar transmission is known from the German Pat. DE-PS No. 16 30 298, in particular FIG. 2 thereof. In it, the various shafts of this transmission are arranged in three axes of which the first axis comprises the drive shaft of the driving motor and the primary shaft of the infinitely variable belt drive, the second axis, which is parallel to the first, comprises the secondary shaft of the belt drive and the driving pinion of the differential gearing, whilst the third axis, which is transversely mounted at a right angle to the second, comprises the output shafts of the differential gearing leading to the driven front wheels.

In this known transmission the shaft of the driving motor is mounted in the longitudinal direction of the vehicle. Correspondingly, the primary and the secondary shaft of the belt drive are also mounted in the longitudinal direction of the vehicle, whereas the output shafts are mounted transverse to the vehicle to drive the front wheels.

When the driving motor is mounted in the longitudinal direction of the vehicle it takes up a relatively long space in the vehicle and the differential gearing has to be accommodated below the sump, giving rise to considerable problems with assembly and disassembly.

However, the known transmission has the advantage that, if both, a infinitely variable transmission and a manual transmission have to fit in the same vehicle, the reversal of the direction of rotation of the driving pinion of the differential gearing induced by a transition from a belt drive to a toothed gear can be accommodated in a simple fashion, for instance, by a changeover of the differential gearing from a design with the crown wheel meshing on the left-hand side of the pinion to a design with the crown wheel meshing on the right-hand side of the pinion. It is thereby possible in a simple fashion without costly alterations to accomplish the necessary reversal of the direction of rotation for maintaining the forward motion of an automobile both with an infinitely variable belt drive and with a manually operated gearbox.

The developments in automobile construction toward more compact and economical vehicles has led to a change in drive-line lay out to transverse mounted engines combined with a mechanical, infinitely variable belt drive.

For examples, reference may be made to the German patent applications DE-OS Nos. 29 48 194, 29 48 195 and U.S. Pat. No. 4,317,389 which relate to such transmission, collectively known under the umbrella term "two-axes type".

These transmission of the two-axes type have the disadvantage that the distance between the drive shaft of the driving motor and the output shafts to the driven front wheels is determined by the gearing and that, in addition, a highly complex component is needed at the secondary axis of the belt drive.

For a further example, reference is made to the German patent application DE-OS No. 29 28 191 which relates to a similar transmission of a so-called four-axes types. A transmission of the four-axes type has the disadvantage that the spatial arrangement of the four axes necessitates a more complicated gear box and requires more space.

It is an object of the present invention to provide a transmission of the three-axes type in such a fashion that it can be applied in combination with a driving motor mounted transverse to the longitudinal direction of the vehicle, making allowance in advance for optional provision of a manually operated gearbox and a infinitely variable belt drive. In such three-axes design the position of the first and the third axis of the transmission can be left unchanged, whilst the position of the second axis can be changed as required in accordance with the requirements of the manual gearbox and the infinitely variable belt drive, respectively.

According to the invention this problem is solved by a reduction gear mounted coaxially with the secondary shaft of the belt drive, which gear consists of a planetary gearset being connected through its input member to said secondary shaft and through its output member to the drive pinion of the differential gearing.

Because the reduction gearing is mounted coaxially with the secondary shaft of the belt drive and constructed as a planetary gearset, being connected on its input shaft to the secondary shaft and on its output shaft to the driving pinion of the differential gear, the pinion is driven in the same direction of rotation, no matter whether the transmission comprises an infinitely variable belt drive or a manually operated gearbox, so that no difficulties arise when an automobile model is variously equipped, as desired, with different types of drive.

In addition, it is possible by relatively simple means to install different reduction ratios which are adapted to various types of engines. Because several over-all reductions are required, depending on which type of engine is applied, it can be ensured by appropriate designing of the planetary reversing and reduction gearset that the range of transmission ratios of the belt drive is fully and effectively available.

Figure 2:
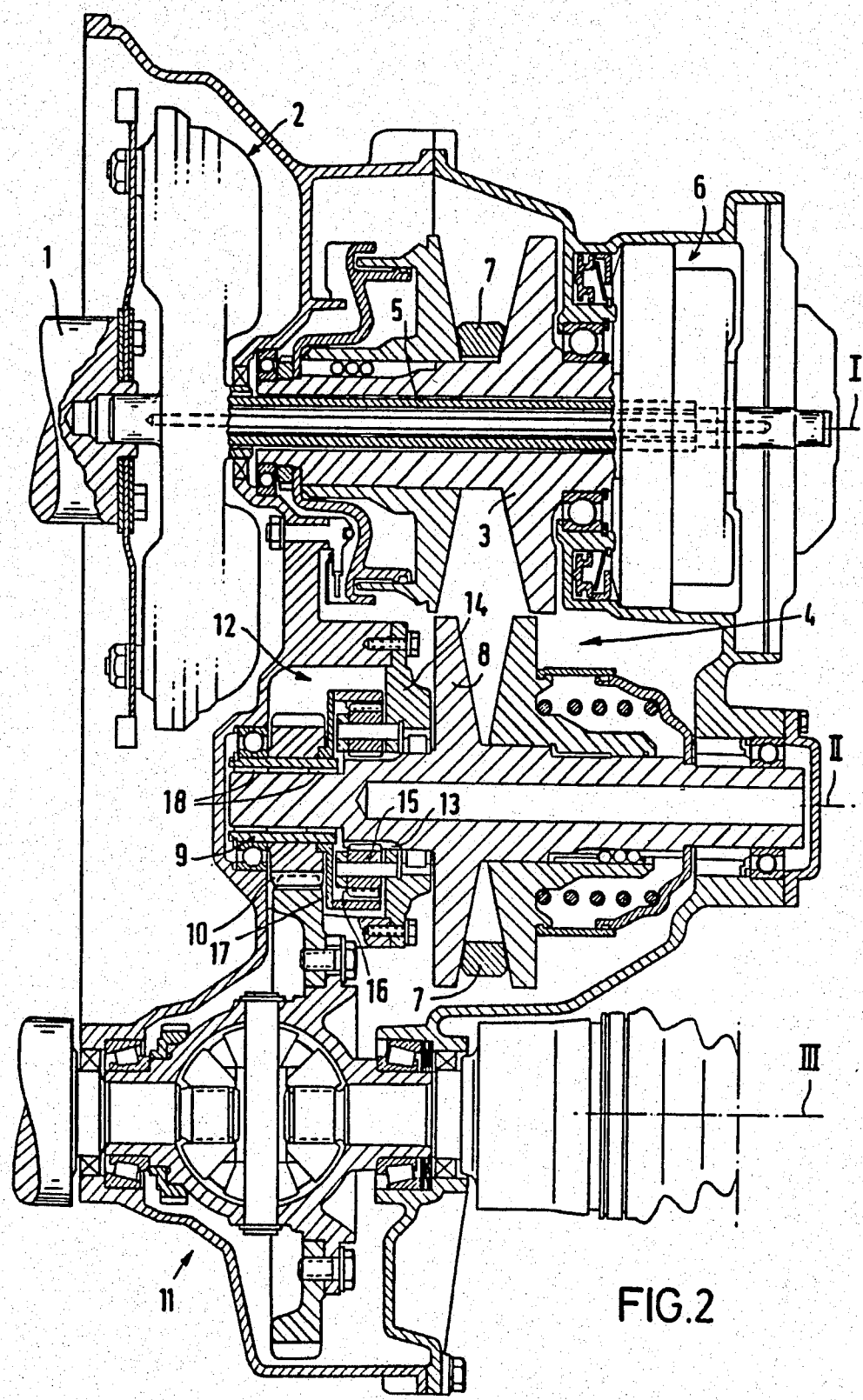
Figure 3:
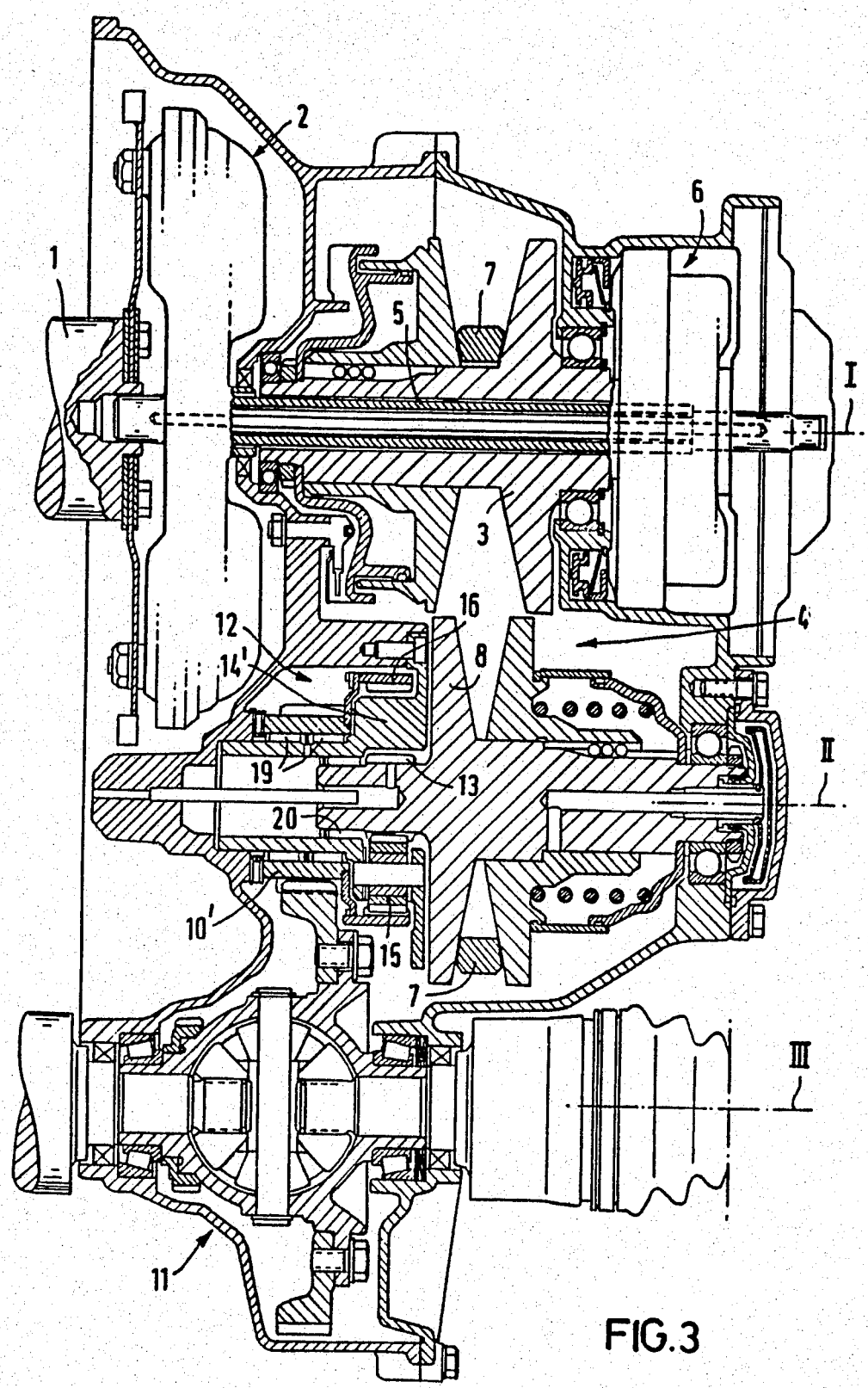

The invention is elucidated further by reference to several examples shown in the drawings. These depict:

FIG. 1 a transmission according to the invention viewed toward the driving motor;

FIG. 2 a cut-away section through the transmission of FIG. 1 on the line A—A;

FIG. 3 a section similar to FIG. 2, but with a preferred arrangement of bearings in the reduction gear according to the invention.

In the figures the three axes of the transmission are designated I, II and III.

Axis I consists of the driving shaft 1 of the driving motor which is connected in the example of FIG. 1 with a driving shaft 5 running coaxially with the primary shaft 3 of the belt drive 4 via a starting unit 2 known as such, which may consist of, for instance, a hydraulic coupling, a hydrokinetic torque converter, a centrifugal clutch, an electromagnetic coupling or similar device, the said driving shaft 5, being connected to the input member of a forward-reverse shift gearset 6 mounted in front of the primary shaft 3, whilst the output member of the forward-reverse shift gearset 6 is connected to the primary shaft 3 of the infinitely variable belt drive 4.

The primary shaft 3 drives the secondary shaft 8 of the infinitely variable belt drive 4 through a drive belt or chain denoted with 7.

The assembly and the control as well as the forward-reverse shift gear of such an infinitely variable belt drive 4 are not objectives of the present invention and are not explained any further, because they are generally known.

In the embodiment depicted in FIG. 2 the secondary shaft 8 is at one side conceived as an internal shaft, having an external hollow shaft 9 fitted round it and carrying the driving pinion 10 of the differential gearing 11. Between the secondary shaft 8 and the driving pinion 10 a reduction gearset 12 is mounted, taking the form of a planetary gearset, which ensures that the pinion 10 is driven in a direction of rotation opposite to that of secondary shaft 8 and with a reduced speed.

The secondary shaft 8 forms a sun gear 13 which meshes with a set of planet gears 15 attached to a planet-gear support 14 fixed to the casing, whilst the planet gears 15 in turn engage with a ring gear which is connected through a rim 17 to the hollow shaft 9 on which the driving pinion 10 is fixed.

According to the example given in FIG. 2, the hollow shaft 9 is rotatably mounted direct on a cylindrical extension of the secondary shaft 8 while being supported in needle bearing 18.

In the preferred embodiment according to FIG. 3, the hollow shaft is integrated with the pinion to form a one-piece component 10' and is rotatably mounted by means of needle bearing 19 on a supporting bush 14' which forms an integral unit with the planet-gear support fixed to the casing. The secondary shaft 8 is supported by means of needle bearing 20 inside the supporting bush 14'.

The embodiment according to FIG. 3 is to be preferred by reason of the fact that the rotation speeds to be accommodated by the needle bearings 19 and 20 are substantially more favourable than the high relative rotation speeds between the secondary shaft 8 and the hollows shaft 9 to be accommodated by the needle bearings 18, which will occur with the embodiment according to FIG. 2.

What is claimed is:

1. In a front wheel drive vehicle having a driving motor mounted transverse with respect to the vehicle, the driving motor having a drive shaft, an infinitely variable belt drive having a primary shaft and a secondary shaft and a drive belt, the primary shaft being driven by said drive shaft and the secondary shaft being driven in the same direction of rotation by means of the drive belt and mounted coaxially with a drive pinion of a differential gearing with output shafts extending transverse with respect to the vehicle, characterized in that a reduction gear assembly is mounted coaxially with said secondary shaft, said reduction gear assembly including a planetary gear set having a casing, a sun gear meshing with planet gears attached to a planet-gear support which is permanently fixed to the casing and a ring gear meshing with the planet gears, said sun gear being connected to said secondary shaft and said ring gear being connected by means of a rim to a shaft on which the driving pinion of the differential gearing is fixed.

2. A transmission according to claim 1 characterized in that the shaft which carries the driving pinion is a hollow shaft rotatably mounted on the secondary shaft by means of needle bearing.

3. In a front wheel drive vehicle having a driving motor mounted transverse with respect to the vehicle, the driving motor having a drive shaft, an infinitely variable belt drive having a primary shaft and a secondary shaft and a drive belt, the primary shaft being driven by said drive shaft and the secondary shaft being driven in the same direction of rotation by means of the drive belt and mounted coaxially with a drive pinion of a differential gearing with output shafts extending transverse with respect to the vehicle, characterized in that a reduction gear mounted coaxially with said secondary shaft includes a planetary gear set having a casing, an input member connected to said secondary shaft and having an output member connected to a shaft on which the driving pinion of the differential gearing is fixed, said last-named shaft forming an integral unit with the driving pinion and being rotatably mounted by means of needle bearings on a supporting bush which forms an integral unit with a planet-gear support which is fixed to said casing, while inside the said supporting bush the secondary shaft is supported by means of needle bearings.

* * * * *